C. F. NICKERSON.

PULLEY ADAPTER.

APPLICATION FILED MAY 19, 1921.

Reissued July 19, 1921. 15,159.

INVENTOR

C. F. Nickerson by Wright Brown & Quinby

ATTORNEYS

UNITED STATES PATENT OFFICE.

CHARLES F. NICKERSON, OF READING, MASSACHUSETTS.

PULLEY-ADAPTER.

15,159. Specification of Reissued Letters Patent. Reissued July 19, 1921.

Original No. 1,371,512, dated March 15, 1921, Serial No. 254,111, filed September 14, 1918. Application for reissue filed May 19, 1921. Serial No. 470,906.

*To all whom it may concern:*

Be it known that I, CHARLES F. NICKERSON, a citizen of the United States, residing at Reading, in the county of Middlesex and State of Massachusetts, have invented new and useful Improvements in Pulley-Adapters, of which the following is a specification.

The chief object of this invention is to adapt the driving pulley on the main shaft and the driven pulley on the fan shaft of the engine of a Ford automobile, for engagement with and connection by a resilient round belt made from helical wire, so that a resilient round belt may be conveniently substituted for the ordinary flat non-resilient belt with which such engines are customarily provided, without the removal of the usual flat-belt-engaging pulleys.

I attain this object by applying adapters to the said driving and driven pulleys, each adapter constituting an enlargement of the pulley to which it is applied, and being formed externally to engage a helical wire belt and provided with means whereby it may be securely clamped upon the pulley, no change or modification of the latter being required.

Of the accompanying drawings forming a part of this specification,—

Fig. 5 is a side view of the main shaft pulley without its adapter.

The same reference characters indicate the same parts in all of the figures.

Figure 1:
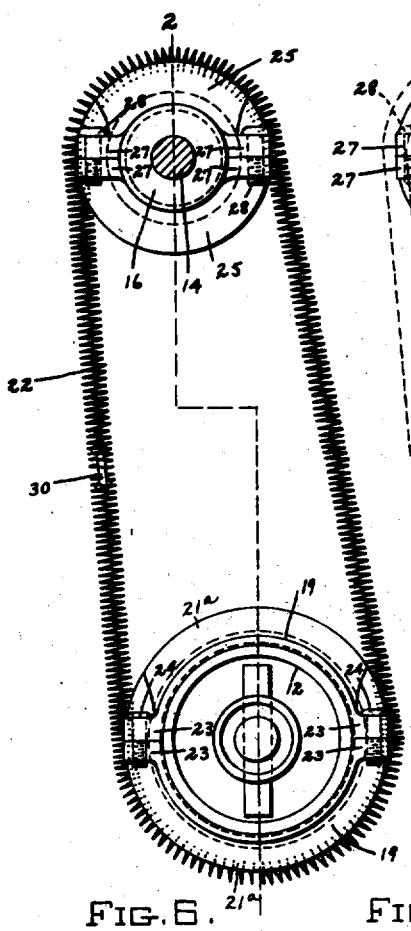
Figure 1 shows in end elevation the fan shaft pulley and the main shaft or driving pulley of a Ford engine equipped with adapters embodying the invention, and a helical wire belt engaged with said adapters.
Figure 3:
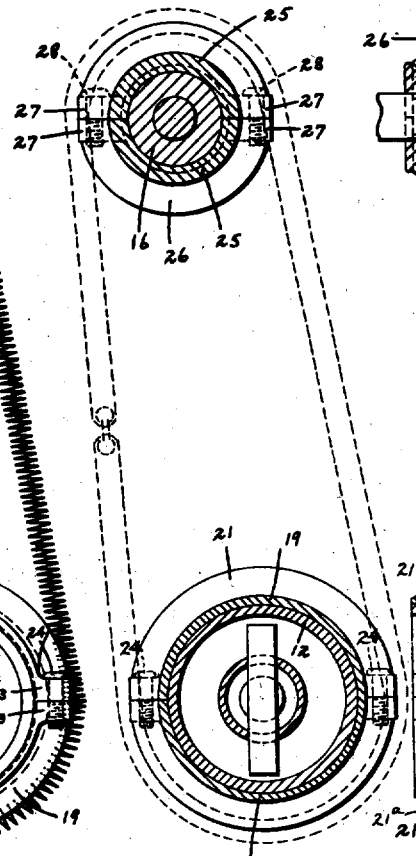
Fig. 3 is a section on line 3—3 of Fig. 2.
Figure 2:
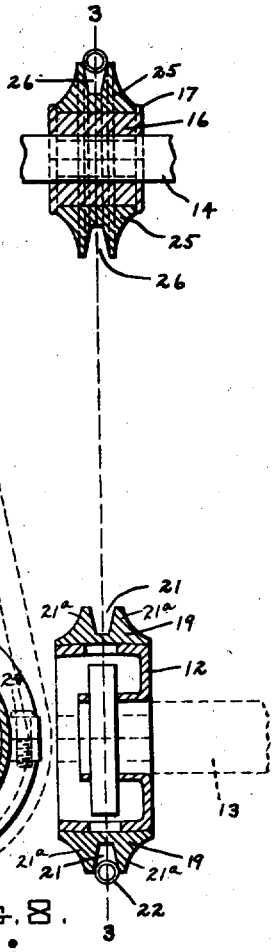
Fig. 2 is a section on line 2—2 of Fig. 1.
Figure 6:
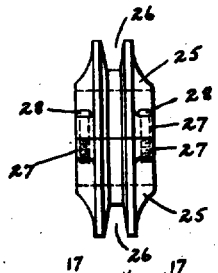
Fig. 6 is a side view of the fan shaft pulley adapter.
Figure 7:
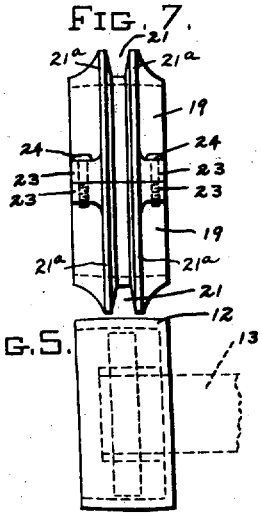
Fig. 7 is a side view of the main shaft pulley adapter.

In the drawings 12 represents the driving pulley, usually attached to the main shaft 13 of a Ford engine, said pulley being formed to engage a flat leather belt, and its periphery being somewhat convex or crowned, as shown by Figs. 2 and 5.

14 represents the fan shaft, which is parallel with the main shaft 13, and is provided with the usual flat-belt-engaging pulley 16, having end flanges 17. The pulleys 12 and 16 are arranged in the same vertical plane, so that a transversely flat leather belt is adapted to run upon the pulleys and communicate motion from the driving pulley 12 to the driven pulley 16.

In carrying out my invention, I apply to each of said pulleys a non-continuous annular adapter, formed internally to embrace the periphery of the pulley, and having separable portions permitting the application of the adapter to the pulley and its contraction on the pulley. The adapter is provided with round belt-guiding external flanges at opposite sides of the central zone of the annulus, and with coupling means adjustably connecting the separable portions, to clamp the adapter on the pulley, the coupling means being carried wholly by the adapter, and having no engagement with the pulley, so that the employment of the adapter involves no modification of the pulley. The belt-guiding flanges and coupling means are located at opposite sides of the central zone of the annular adapter, so that the said zone is unobstructed and the adapter is rotatable in the bight of a round belt. As shown by the drawings, I have embodied the coupling means in apertured ears formed on the separable portions of the adapter, at opposite sides of said central zone, and bolts engaged with said ears to clamp the adapter on the pulley. An adapter embodying the invention intended for use on the driving pulley 12, having a convex or crowning periphery, is internally concave, and conforms to said periphery to prevent lateral displacement of the adapter.

The drawings show a non-continuous annular adapter composed of two arcuate sections, the ends of which form the separable portions of the adapter and are provided with coupling means whereby said separable portions may be drawn toward each other to clamp the adapter on a pulley, the arrangement being such that the central zone of the adapter is unobstructed and the adapter is rotable in the bight of a round belt.

19, 19 represent the sections of the adapter applied to the driving pulley 12. Each portion 19 has a semi-circular internal face, which is transversely concave and conforms closely to a portion of the crowned exterior of the pulley 12, to prevent lateral displacement of the adapter when it is clamped, as hereinafter described, on the pulley. The external face of each section 19, is provided with spaced apart arcuate flanges 21[a], forming the sides of a groove 21, formed to engage a helical wire belt 22. The sections 19 are provided with coupling means, whereby they may be securely clamped on the pulley, said means being embodied in ears 23, formed on the ends of the sections, at opposite sides of the grooves 21, and threaded bolts 24 inserted in coinciding orifices in said ears, the orifices in ears of one section being screw-threaded to engage the bolt-threads. The said coupling means and the flanges 21[a] are located at opposite sides of the central zone of the adapter, said zone being formed by the bottom of the groove 21. Said zone is, therefore, unobstructed entirely around the circumference of the adapter, so that the pulley having the adapter may rotate in the bight of a round belt.

25, 25 represent the sections of the adapter applied to the driven pulley 16. Each of said sections has a semi-circular inner face conforming closely to the periphery of the pulley 16, between the flanges 17 thereof, as shown by Fig. 2, said flanges preventing lateral displacement of the adapter. The sections 25 are provided with belt-engaging grooves 26, and with ears 27 and bolts 28, whereby the sections may be clamped upon the pulley 16.

It will now be seen that the described adapters constitute enlargements of the pulleys to which they are applied, and enable said pulleys to be connected by a helical wire belt, the relative proportions of the pulleys being the same as before.

The coupling means carried wholly by the adapter and having no engagement with the pulley, enables the adapter to be applied without any change or modification of the pulley, so that the owner of a Ford car may substitute a resilient belt for the usual non-resilient leather belt by simply applying the adapters to the pulleys 12 and 16, and applying the belt to the adapters.

Figure 8:
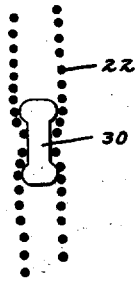
Fig. 8 is a sectional view of a portion of the helical wire belt.
Figure 4:
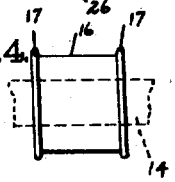
Fig. 4 is a side elevation of the fan shaft pulley without its adapter.

The belt 22 can be made of a single length of helically coiled wire, the ends of which are coupled together by a dumb-bell-shaped member 30, upon the enlarged ends of which the end convolutions of the wire are closed or contracted, as shown in Fig. 8. The contracted convolutions are free to turn or slip on the enlarged ends of the coupling member.

I claim.

1. For application to a flat belt-engaging pulley, a non-continuous annular adapter, formed internally to embrace the periphery of the pulley, and having separable portions permitting its application to, and its contraction on the pulley, round belt-guiding external flanges, and coupling means carried wholly by the adapter and adjustably connecting said separable portions to clamp the adapter on the pulley, said flanges and coupling means being located at opposite sides of the central zone of the adapter, so that the adapter is rotatable in the bight of a round belt.

2. For application to a flat belt-engaging pulley, a non-continuous annular adapter, formed internally to embrace the periphery of the pulley, and having separable portions permitting its application to, and its contraction on the pulley, round belt-guiding external flanges, apertured ears formed on said separable portions, and bolts engaged with said ears to clamp the adapter on the pulley, said flanges and ears being located at opposite sides of the central zone of the adapter, so that the adapter is rotatable in the bight of a round belt.

3. A pulley adapter substantially as specified by claim 1, the adapter being internally concave and conforming to the convex or crowned periphery of a driving pulley, to prevent lateral displacement of the adapter.

4. A round belt-engaging pulley adapter comprising a pair of arcuate sections, each formed as a single piece, and having a semi-circular internal face conforming to one half of the periphery of a flat belt-engaging pulley, and a semi-circular external groove opening at its ends on the ends of the section and formed to engage a round belt, said sections being provided with coupling means external to the grooves therein, whereby the sections may be clamped upon a pulley to form a continuous two part annulus having a continuous external groove.

5. A round belt-engaging pulley adapter comprising a pair of arcuate sections each formed as a single piece, and having a semi-circular internal face conforming to one half of the periphery of a flat belt-engaging pulley, a semi-circular external groove opening at its ends on the ends of the section, and formed to engage a round belt, apertured ears on the section-ends at opposite sides of the groove-ends, and bolts engaged with said ears to clamp the two sections on a pulley and maintain the grooves in registration with each other, so that the assembled sections form a continuous externally grooved two part annulus.

6. A pulley adapter substantially as specified by claim 4, the internal faces of said sections being concave and conforming to the convex or crowned periphery of a driving pulley, to prevent lateral displacement of the annulus formed by the sections.

CHARLES F. NICKERSON.